3,265,872
NAVIGATIONAL INSTRUMENT
Donald S. Bayley, Bedford Village, N.Y., assignor to M. ten Bosch, Inc., Pleasantville, N.Y., a corporation of New York
Filed Nov. 10, 1953, Ser. No. 391,361
17 Claims. (Cl. 235—150.271)

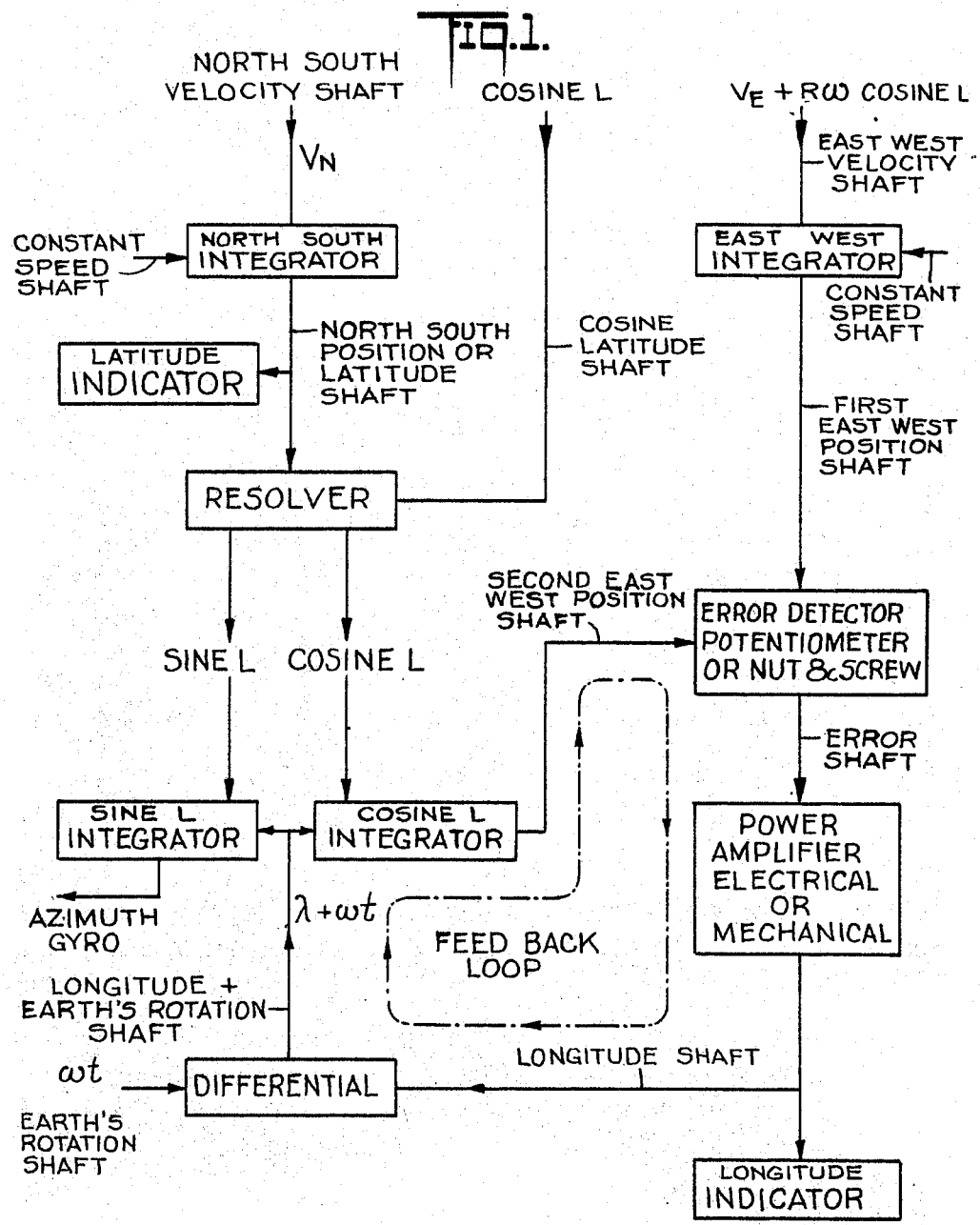

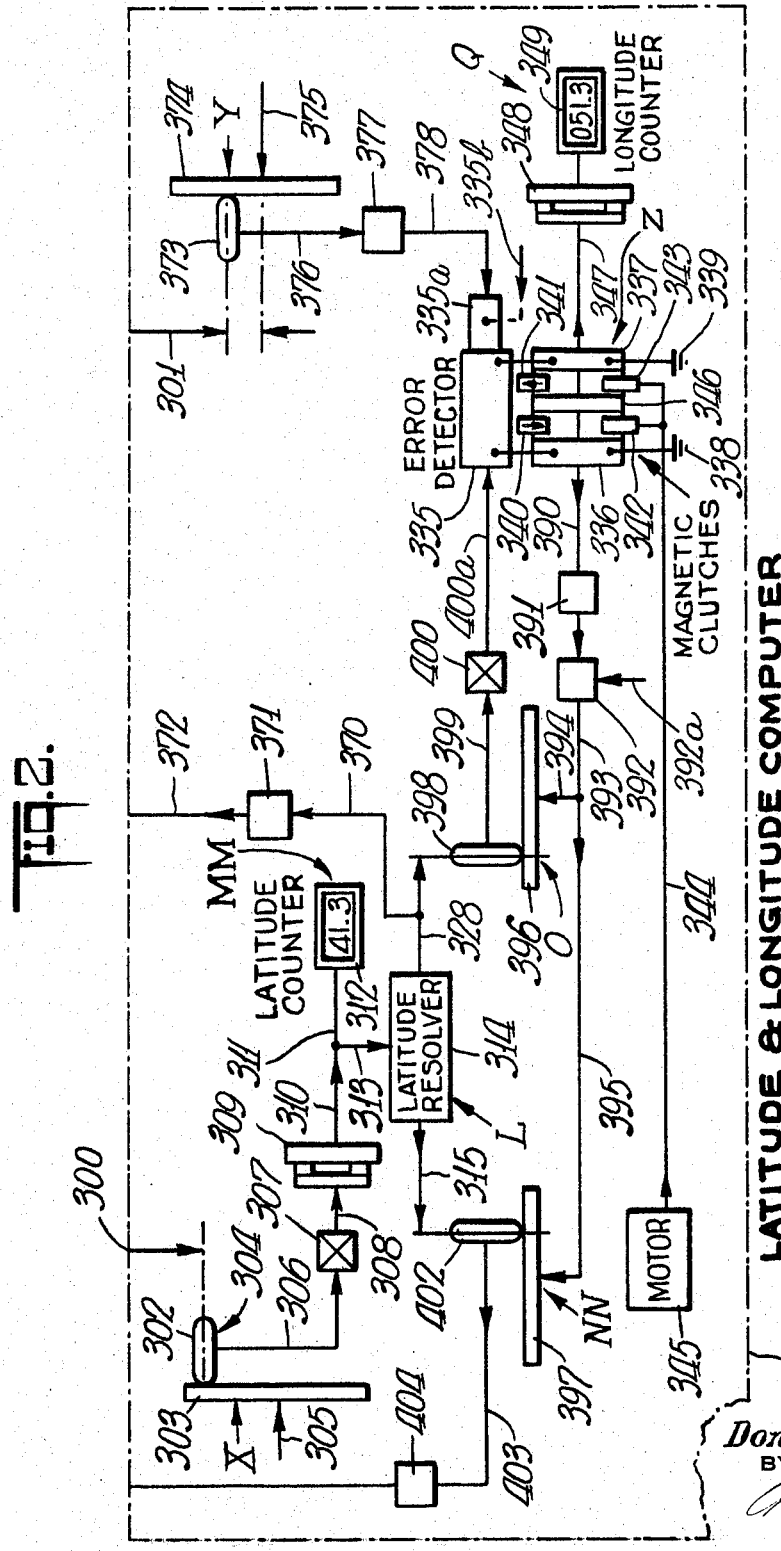

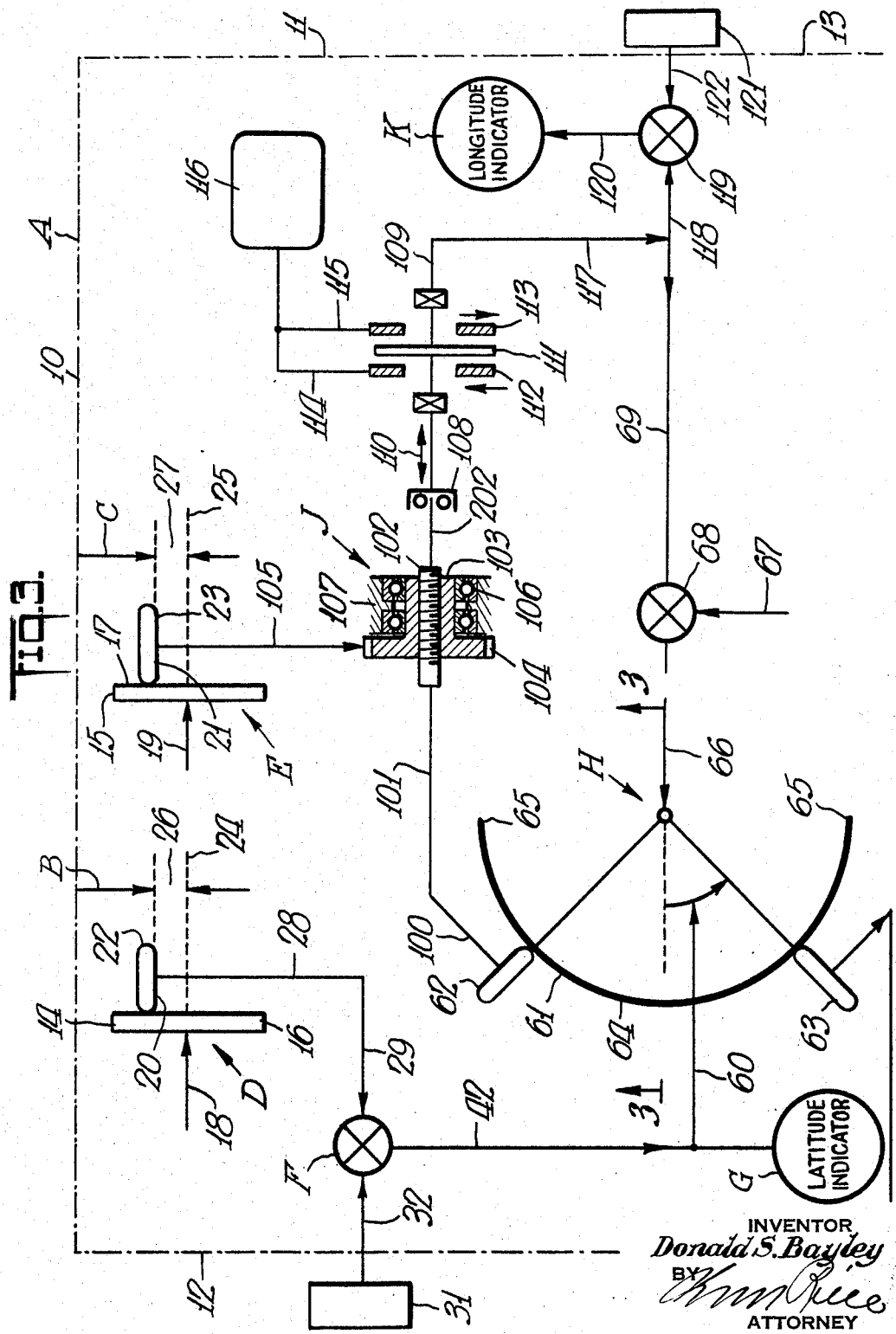

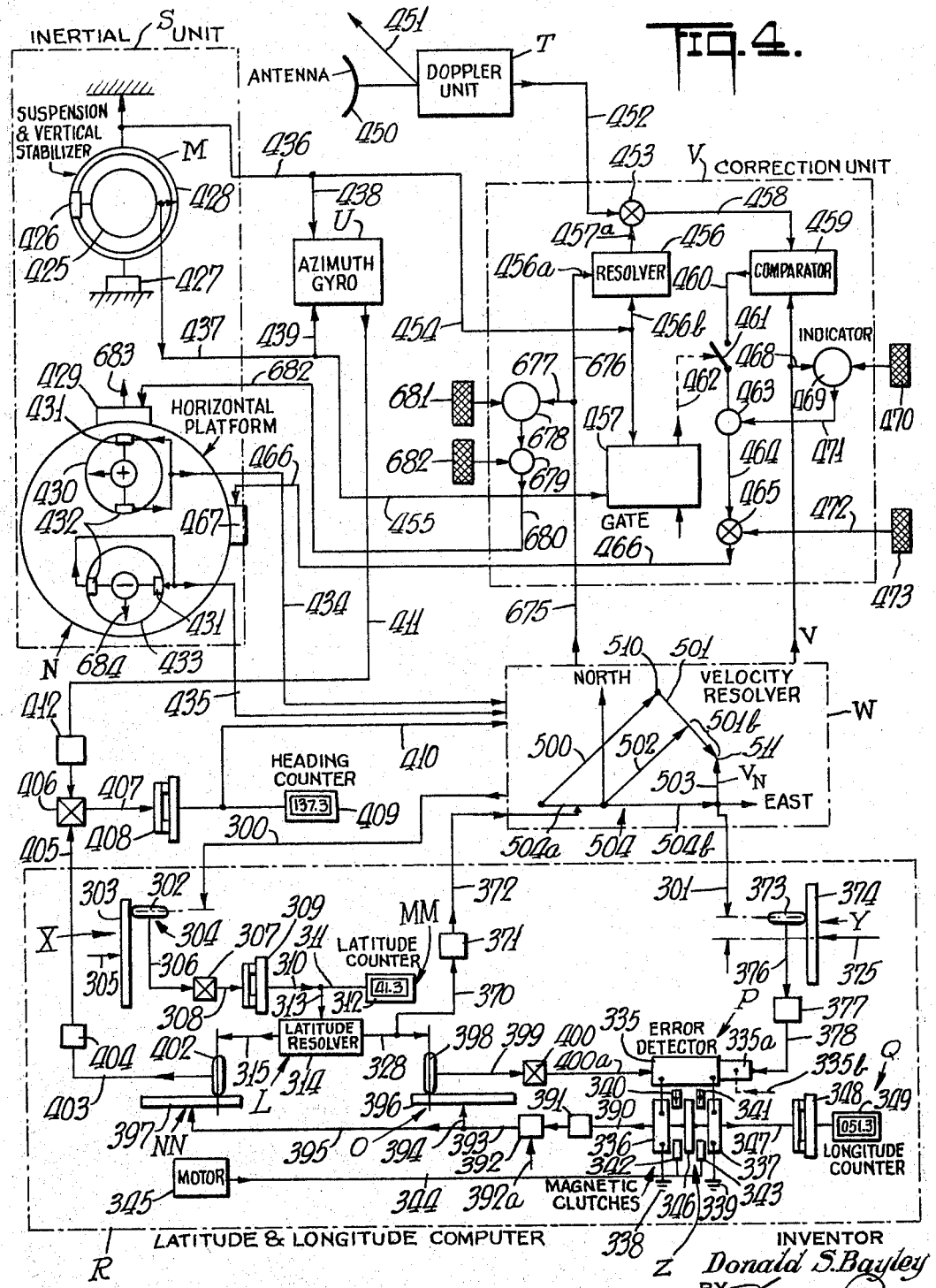

The present invention relates to a navigational instrument, and it particularly relates to a navigational instrument for aircraft.

In most navigational instruments for aircraft which give a computation of latitude and longitude, it is not possible to obtain computations of longitudes at latitudes above 70°, i.e. within 1200 nautical miles of a terrestrial pole.

It is a particular feature of the present invention that it relates to a navigational instrument for aircraft which will function effectively to give accurate latitude and longitude determination even when the aircraft is within several miles of a terrestrial pole.

It is among the objects of the present invention to provide a navigational instrument for aircraft which will reliably indicate the position of the aircraft in terms of its latitude and longitude and which in particular will reliably indicate the position of the aircraft near the poles where a relatively small east-west velocity will give a relatively large change in longitude.

Another object is to provide a simple, navigational instrument for aircraft which also has application to land vehicles or sea craft which will enable ready, immediate, reliable indication of the geographical position or the latitude and longitude of the vehicle at all times, without having expensive equipment or apparatus occupying too much space or unduly increasing the weight characteristics of the vehicle, and which will not require repeated or frequent servicing.

Another object is to provide a simple, small instrument to be used in a fixed location which, upon receipt of initial position and velocity information or corrections thereto, of an arcraft or other moving vehicle, will reliably and continuously determine and indicate the latitude and longitude of the vehicle at any future time.

Another object is to provide a latitude-longitude indicator which will give reliable longitude readings at high latitudes without excessive power requirements.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

According to a preferred embodiment of the present invention, the latitude-longitude meter, after once being set to an initial position corresponding to the initial position of the vehcle, will receive information or signals indicating the velocity of the aircraft, both in a north and south direction, as well as in an east and west direction. A large variety of calculating or information-supplying instruments may be employed to supply the required velocity components. For example, the velocity sensing unit may include various combinations of Doppler units, inertia units, azimuth gyroscopes, resolvers, comparators and the like.

A particular feature of the present invention resides in the accuracy and adaptability of the instrument to give correct readings when the aircraft is closely adjacent to the pole and which, nevertheless, will also give accurate readings of both latitude and longitude at low as well as high latitudes.

In the preferred arrangement the instrument or latitude and longitude computer of the present invention can quickly, accurately and reliably compute the change in longitude even at the high rates of such change encountered near the poles or in the polar regions, and in the preferred embodiment there is provided a Doppler unit together with an inertial unit, which are associated with the azimuth gyroscope and correction unit, to supply information to a resolver of electrical or mechanical type which in turn will supply the necessary velocity information to the inputs of the latitude and longitude computer.

In one preferred embodiment of the present invention the north-south velocity is fed into an integrator device which in turn will supply the change in latitude to a latitude indicator as well as to a resolver which will resolve the change in latitude into a sine of the latitude component and a cosine of the latitude component.

The sine of the latitude component is used in obtaining a correction to the information supplied to the azimuth gyroscope.

The cosine of the latitude component is fed to an integrator whose output is an east-west position calculated by using longitude information.

At the same time the east-west velocity information is fed to another integrator which calculates east-west position from this velocity information.

The outputs of these two integrators, both of which are east-west positions, are fed to an error detector which may include a nut and screw in a mechanical or a potentiometer in an electrical arrangement.

The output of the error detector is proportional to the difference of these two inputs and in turn controls an electrical or mechanical power amplifier to drive a longitude shaft. This shaft drives the longitude indicator and also feeds the cosine and sine of latitude integrators.

The result of this feed back action is that the power amplifier operates to hold the output of the error detector at zero. This means that the two inputs to the error detector must remain equal and the result is a correct power driven and simple computation of longitude from the east-west position.

The disc of the cosine latitude integrator is driven by the longitude shaft and its roller is displaced from the center of the disc by the cosine of the latitude.

This arrangement permits a finite limitation on the diameter of the integrator disc as contrasted to an alternative device which makes use of the secant of the latitude in which the integrator disc diameter would have to become very large approaching the infinite at higher latitudes. Such a computer which utilizes the secant of the latitude would not be effective closer to the polar regions than 70° latitude.

The disc of the sine latitude integrator is also driven by the longitude shaft and its roller is displaced from the center of the disc by sine of latitude. The output of this integrator is the required correction for the spatial change in the north direction which must be applied to the output of an azimuth gyroscope to obtain true heading of the vehicle or aircraft.

One particular feature of the present invention which distinguishes it from other navigational instruments which compute latitude and longitude is that an east-west position is computed from the integral of the east-west velocity and is compared with another computation of the east-west position which involves the longitude and cosine of latitude. The difference in these two computed positions provides the error signal for a feedback loop involving a power amplifier which must operate to hold this error signal at zero and in so doing drives a longitude shaft so as to indicate the correct longitude.

Another distinguishing feature of the present invention is the computation of the spatial change in the north direction from the longitude, earth's rotation, and the sine of latitude. This makes available as an output the correction which must be applied to an azimuth gyroscope to give true heading.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a schematic layout of a typical latitude and longitude computer according to the present invention.

FIG. 2 is a more detailed showing of the latitude and longitude computer.

FIG. 3 is a diagrammatic plan layout of an alternative latitude and longitude indicator system.

FIG. 4 is a schematic layout showing the relationship between the inertial unit, the Doppler unit, the azimuth gyroscope unit, the resolver unit and the latitude and longitude computer unit.

FIG. 1 shows diagrammatically a computer layout which receives information as to the north-south and east-west velocity of the aircraft.

As indicated at the left the north-south velocity ($V_N$) is integrated with respect to time to give the latitude. This latitude is then supplied to a latitude indicator and also to a resolver which resolves the information into sine of latitude information and cosine of latitude information.

The sine of latitude information is integrated with respect to longitude to correct the information obtained from an azimuth gyroscope not shown on FIG. 1.

The cosine of latitude information is integrated with respect to longitude and supplied to a mechanical or electrical error detector by the second east-west position shaft.

At the right side of the diagram of FIG. 1 it is indicated that information as to the east-west velocity ($V_E$) is integrated with respect to time, to give the east-west position which is supplied to the error detector by the first east-west position shaft.

The arrow Z as utilized upon FIGS. 2 and 4 is intended generally to indicate the combination 336, 337, 340, 341, 342 and 343 in FIG. 2 and the same elements in FIG. 4 which altogether constitute the torque amplifier designated Z.

It will be noted in FIG. 1 that the differential is fed by the earth's rotation shaft. This is to provide a correction for rotation of the earth not only for the latitude-longitude computer, but also for the azimuth gyroscope. The north-south and east-west velocity inputs to the latitude and longitude computer are actually the velocity components of the vehicle or aircraft with respect to a nonrotating earth and the latitude and longitude indicators then give the latitude and longitude with respect to rotating earth.

In case the latitude and longitude computer is used with equipment which gives velocity components with respect to rotating earth, the earth rotation shaft is held fixed.

Referring to FIGS. 2 and 4 the present invention is particularly directed to the longitude and latitude computer unit R, shown by itself in FIG. 2 and in association with the information supplying equipment in FIG. 4, with the computer being positioned in the lowermost box outlined by the dot and dash lines in FIG. 4.

In the upper left hand portion of FIG. 4 there is shown diagrammatically the inertial unit S. At the right of this unit is shown the Doppler unit T.

The inertial unit S and the Doppler unit T are associated with the azimuth gyroscope U, the correction unit V and the velocity resolver unit W.

The latitude and longitude computer R of FIGS. 2 and 4 includes a north-south velocity integrator X, an east-west velocity integrator Y, a latitude resolver L, a latitude counter MM, a sine latitude integrator NN, a cosine latitude integrator O, an error detector P associated with a torque amplifier Z, which is associated with the longitude indicator Q.

Referring to the latitude and longitude computer R, this unit receives information as to the velocity component in a north-south direction through the transmission 300. This transmission 300, as is true of the other transmissions to be subsequently described, may consist of the electrical or mechanical connections.

The information received through the connection 300 will move the driven roller 302 of the integrator X closer or farther away from the center of the rotating integrator disc 303. This disc 303 has a constant speed drive 305.

The rotation of the roller 302 is the output of the integrator X and is proportional to latitude. This latitude information is transmitted by the gear ratio 307, and the slip clutch 309 to the latitude counter 312. It is also transmitted at 313 to the latitude resolver V.

The latitude resolver L will give sine and cosine characteristics. The sine latitude characteristic supplies a correction to be transmitted to the reading of the azimuth gyroscope U. This correction is needed at all places but is particularly important when the aircraft is adjacent to a terrestrial pole.

The latitude resolver L may include suitable internal gear and pinion arrangements or it may consist of a Scotch yoke arrangement where mechanical structure is utilized. Where an electrical arrangement is utilized it may consist of two coils, one fixed and the other rotatable in respect thereto.

The required output is supplied by the rotation of the roller 402. The roller 402 is connected by the shaft 403, the gear 404 and the shaft 405 to the differential 406 (see FIGS. 2 and 4). The output 407 of the differential 406 drives the heading counter 409, and the velocity resolver W through the slip clutch 408. The other input to the differential 406 is furnished by the gear 412 from the output shaft 411 of the azimuth gyroscope U.

The differential 406 will add or subtract from the information concerning the azimuth generated by gyroscope U, coming down through the conductor or shaft 411 and through the gear 412 to the differential 406 to make the necessary correction for the aircraft heading.

The information then supplied through the connection 407 will give the aircraft heading which is subject to an initial setting at the slip clutch 408.

The correct heading will be supplied through 410 to the velocity resolver W and will also be supplied to the heading counter 409.

The cosine information will be supplied from the latitude resolver through the connection 328 to the roller 398. The integrator roller 398 in turn has a connection 399 to the gear 400.

From the gear 400 there is provided a connection 400a to the error detector 335 which may consist of a regular or step potentiometer. This potentiometer may consist of a contact brush 335a having a conductor lead 335b with the main potentiometer coil or winding being indicated at 335.

The potentiometer 335 may be linear or otherwise shaped to be of the stepped type.

The potentiometer 335 will move the opposing rotating magnetic pole pieces 340 and 343 to one side or the other by alternately energizing the opposing magnets 336 and 337. The magnets 336 and 337 when energized cause the magnetic pole pieces 340 and 343 to engage the clutch disk 346, thus causing a driving connection. Normally the magnetic elements 336 and 337 remain fixed while pole pieces will throw the clutch disc 346 in one direction or the other to change the direction of the longitude shaft indicated by the numerals 347 and 390.

One clutch face is indicated by the blocks 340 and 342 and will give a down drive while the other clutch face is indicated by the blocks 341 and 343 and will give an up drive.

The motor 345 drives the clutch through the shaft or connection 344. The ground for the magnetic units 336 and 337 is indicated at 338 and 339.

The clutch arrangement 340 to 346, or torque amplifier Z, will operate the shaft 347 which will operate the longitude counter 349. The slip clutch 348 will enable an initial setting of the longitude counter 349.

In the other direction the magnetic clutch arrangement 340 to 346 will have a connection 390 to the gear ratio 391 which in turn has a connection to the differential 392.

The differential 392 has an additional drive 392a which is a constant speed drive corresponding to the rotating of the earth.

The drive from the shaft 390 and the constant speed drive 392a will be transmitted at 393 and through the connections 394 and 395 to the integrator discs 396 and 397 which in turn drive the rollers 398 and 402.

The east-west velocity information is transmitted from the vector or velocity resolver W of FIG. 4 by the connection 301. This connection 301 will change the position of the integrator roller 373 in respect to the rotating integrator disc 374.

The integrator disc 374 is driven by the constant speed shaft 375. The roller 373 in turn communicates, as indicated by the directional line 376, with the gear ratio 377 which leads as indicated at 378 to the brush 335a of the error detector 335 and the magnetic clutch arrangement 336-337.

The integrator discs 396 and 397 are driven through the differential 392 from the torque amplifier Z and through the gear ratio 391 and also in the constant speed shaft 392a which adds the earth's rotation.

The rollers 373 and 398 will each transmit an east-west position to the error detector 335.

In the steady state condition the information transmitted from the rollers 373 and 398 should be equal so that the brush 335b will stay in the middle of the coil of the potentiometer 335.

When this occurs the shaft of the torque amplifier unit Z, including the magnets 336 and 337 and the clutch arrangement 340 to 346, will continuously turn the counter indicator 349, so that it reads the correct longitude.

However, when the rollers 373 and 398 do not transmit equal information, the torque amplifier Z will receive a signal and will operate until the information received from the rollers 373 and 398 has been equalized.

To give an example, it may be assumed that the aircraft is flying in an east-west direction.

In this case, the east-west component information from the resolver W will be transmitted together with the linear velocity of the earth to the integrator Y by the connection 301.

At the same time the constant speed or clock drive 392a will supply the angular velocity of the earth to the differential 392.

The information transmitted through the connection 301 will displace the roller 373 in respect to the center of the disc 374, which in turn is driven by the constant speed shaft 375.

The rotation of the roller 373 will be transmitted through the error detector P and the torque amplifier Z to drive the shaft 390, which in turn will drive the disc 396 of the cosine integrator O.

This will cause rotation of the roller 398 of the cosine integrator O which will rotate the winding of the potentiometer 335 to continuously center the brush connection 335b. The result is that the shaft 347-390 will continuously turn through the required change in longitude and change the reading on the counter Q as indicated at 349.

To give another example, the aircraft may be assumed to be stationary at a point on the earth, in which case transmission 301 will only indicate linear velocity of the earth and the roller 373 will indicate the linear distance traveled by the surface of the earth.

The linear velocity of the earth which is supplied through the shaft 301 (see FIGS. 2 and 4) is furnished as an input to the present invention by external equipment which is not part of the latitude and longitude computor to which this invention is particularly directed. This information in respect to the linear velocities of the earth, which is supplied through the shaft 301 in turn is supplied from the Doppler unit T or the inertial unit S via the velocity resolver W.

In this case, the rotation of the roller 373 will displace the brush 335b but the torque amplifier Z will receive no signal since the correction 392a, which indicates the angular velocity of the earth, will drive the disc 396 through the connections 393 and 394 and in turn the roller 398 will then drive the winding of the potentiometer 335 so that it will maintain the same position in respect to the brush 335b, and there will be no change in the longitude counter 349 inasmuch as the torque amplifier Z will receive no signal.

As a third example the aircraft may be assumed flying in a circle around the North Pole and as having changed its longitude by 30°. The spin axis of the azimuth gyroscope U will remain fixed in space and will not of itself indicate the correct heading of the aircraft with respect to north, because the north direction has also changed by approximately 30°.

The required connection will then be computed as a result of rotation of the shaft 395 driving the disc 397 which in turn drives the roller 402 of the sine integrator N. The roller at 402 will be caused to rotate to give the required change in north direction, and this will be applied differentially to the output 411 of the azimuth gyroscope U at the differential 406.

As a fourth example, we may assume that the aircraft is fixed on the earth and the output of the azimuth gyroscope U is changing because of the earth's rotation. The correction in this case for the angular velocity of the earth will be transmitted from the clock drive or constant speed drive 392a to the disc 397. This will drive the roller 402 to correct the output of the azimuth gyroscope at the differential 406.

The linear velocity of any point on the earth in an east-west direction is directly proportional to the angular velocity of the earth times the cosine of the latitude. Since the angular velocity of the earth is constant any shaft rotating in proportion to the cosine of latitude will rotate in proportion to the linear earth's velocity.

Therefore the shafts or connection 328-370, which passes through the gear ratio 371 to the connection 372, will supply this information from the latitude resolver L to the velocity resolver W.

At the same time the velocity components from the inertial unit S will be supplied by the connections 434 and 435 to the velocity resolver W, both of these velocity components 434 and 435 being affected by the rotation of the earth.

The arrangement inside of the velocity resolver is diagrammatically indicated by the vectors 500 to 511. The line 500 is the longitudinal velocity component originating from the inertial unit S.

The line 501 is the transverse or thwartship component from the inertial unit S.

The vector or component 502 is the longitudinal velocity component corrected for the earth's rotation.

Vector 501 is the total thwartship velocity component while 501b is part of the vector 501 corrected for the earth's rotation.

Component 503 is the north-south velocity component while vector 504 is the east-west velocity component including the linear velocity of the earth. Component 504a is the linear velocity of the earth while vector 504b is the east-west velocity component.

It is to be noted that the total component 504 is fed via shaft 301 as east-west velocity transmission to latitude-longitude computer R. For this reason component 504a, which is transmitted via shaft 372 to the resolver W from the latitude-longitude computer R, is not required for operation of the latitude-longitude computer itself.

The electrical or mechanical arrangement inside of the velocity resolver W may widely vary. It may include a plurality of inter-connected rotating slides and swinging screws and nuts.

The inertial unit S is provided with a suspension and vertical stabilizer M having the platform 425, the servo units 426 and 427 and the gimbal 428.

Forming part of the inertial unit S is the horizontal platform unit N which is provided with the torquer 429, the gyroscope 430, the torquer 431, the signal pick off 432 and the gyroscope 433.

The two gyroscopes 430 and 433 rotate in opposite directions. The platform N constitutes the pendulum on one side of which is the torquer M and the other side of which is the signal pick off.

At one side of each of the gyroscopes 430 and 433 are torquers 431 and at the other side are the signal pick offs 432. The tilting axis of the gyroscopes 430 and 433 are 90° apart. This gyroscope 433 supplies information to the resolver W as indicated by the directional lines 434 and 435.

The suspension and vertical stabilizer unit M has connections as indicated at 436 and 437 between which is connected the azimuth gyro U as indicated at 438 and 439. The connections 438 and 439 stabilize the azimuth gyroscope in roll and pitch respectively.

The Doppler unit T is provided with an antenna 450. The arrow 451 shows the fixed angle between the axis of antenna 450 and the roll axis of the airplane. The Doppler unit T may be of radar or electrical type.

From the Doppler unit T information is transmitted as indicated at 452 to the differential unit 453 in the correction unit V. The lines 436 and 454 extend from the suspension and vertical stabilizer to the resolver 456 and the gate 457. The lines 437 and 455 lead from the suspension and vertical stabilizer to the gate 457. From the resolver 456 information is suppled at 457a to the differential at 453 from where it goes by way of connection 458 to the comparator 459.

From the comparator 459 the information flows at 460 through the switch arrangement 461 which is actuated from the gate 457 by the line 462.

If the roll or pitch indication from the inertial unit S to the gate unit 457 exceeds a certain value, the switch 461 will be opened. The opening of the switch 461 will establish disconnection between the velocity information measured by the Doppler unit T coming in at 452 and the information supplied at 466 to the inertial unit S.

With the switch 461 closed the information will flow to the differential 463 and thence as indicated at 464 to the differential 465 and then by means of the connection 466 to the torquer 467 in the horizontal platform unit N of the unit S.

The Doppler unit T will more accurately measure the velocity than the inertial unit S, and when it supplies a signal through the closed switch 461 to the torquer 467, this will cause precession of the gyroscope 430 which measures the longitudinal velocity. There will be no connection between the Doppler unit T and the other gyroscope unit 433. The comparator 459 also has a connection 468 to the indicator 469 which may be set by the initial setting member 470.

The comparator unit 459 will receive a signal from the Doppler unit T at 458 and also from the resolver unit 456 through the connection at 457 and the differential 453. This signal from the resolver unit 456 is derived from the inertial unit S by the connection 454 and will give the necessary correction for roll of the airplane.

The difference between the signal from the Doppler unit T supplied from the differential by the connection 452 and that from the inertial unit S supplied by the connection 454 will supply the correction back to the torquer unit 467. From the torquer unit 467 the correction goes to the longitudinal gyroscope 430.

The comparator 459 may be a differential gearing if mechanical, or a potentiometer with separate drives for the winding and brush.

The gate arrangement 457 may consist of a series of relays which will be operated when the voltage exceeds a certain value to open the switch 461.

Referring to FIG. 3 there is shown within the dot and dash lines 10, 11, 12 and 13 an alternative instrument A in diagrammatic form for indicating latitude and longitude. The shaft B is externally actuated and feeds the north-south velocity component to the integrator D. The shaft C is also externally actuated and feeds the east-west velocity component to the integrator E.

In the preferred system the discs 14 and 15 form part of the integrators D and E and they have friction faces 16 and 17. These discs are driven by constant speed shafts 18 and 19 which may be actuated by synchronous motors or by clocks. The integrators D and E will also be provided with the friction driven wheels 20 and 21, the friction edges 22 and 23 of which will be lightly pressed against the friction faces 16 and 17 of the integrator discs 14 and 15.

The rotation of the input shafts A and B will cause the friction wheels 20 and 21 to change their position upon the discs 14 and 15 closer or farther from the center lines 24 and 25. This will increase or decrease the spacing 26 and 27. As this spacing increases, the speed of the wheels 20 and 21 will increase with maximum rotational speed occurring at the exterior of the integrator discs 14 and 15. However, as the wheels 20 and 21 move closer to the center lines 24 and 25, their speed of rotation will be diminished.

Now, referring to the latitude system, the rotation of the wheel 20 will be communicated by the shafts 28 and 29 to the differential F having the outlet shaft 42. The differential F will also receive the manual adjustment by the hand wheel 31 and the shaft 32.

The differential transmitted change in latitude through the shaft 42 to the latitude indicator G will give a correct latitude indication once it has been initially set by the manual adjustment 31 through the differential gearing F.

The latitude indicator shaft 42 will also have a connection at 60 to move the axis of rotation of the rotating hemisphere 61 of the hemispherical integrator H which also acts as a resolver to obtain the sine and cosine of the latitude.

The friction wheels 62 and 63 on the other hand have fixed axes and will ride lightly upon the outside frictional face of the hemisphere 61. The rotational velocity of the wheels 62 and 63 will increase the farther they are from the central point 64 of the hemisphere 61 and the closer they are to the edges 65 of the hemisphere 61. The hemisphere may be rotated by the shaft 66. The shaft 66 is driven through the differential gearing 68 by the shaft 69 from the torque amplifier J.

The shaft 66 may be driven by a clock work shaft 67 through the differential gearing 68.

The differential 68 and the clock shaft 67 may be omitted, but are used where the input C also includes an additional velocity component resulting from rotation of the earth about its own axis.

Referring to FIG. 3, the nut 103 has ball bearings as indicated at 106 in the support structure 107. When the nut 103 is rotated upon the screw 102 or when the screw 102 is rotated within the nut 103, the shaft 109 will be moved laterally, as indicated by the double arrow 110, through the thrust ball bearing unit 108.

The thrust ball-bearing unit 108 takes up the lateral thrust resulting from differential movement of the nut 103 and the screw 102.

The clutch gears 112 and 113 are driven in opposite directions by the motor 116.

The central clutch plate 111 will be fixed to the shaft 109 so that it will be moved longitudinally with the shaft 109 to clutch either with the clutch gear 112 and be turned in one direction, or with the clutch gear 113 and be turned in the other direction.

The end of the shaft 109 is provided with a connection to the shaft 117. The shaft 117, as shown in FIG. 4, may be connected to drive both shafts 118 and 69. The shaft 118 leads to the differential gearing 119.

The differential gearing 119 in turn drives the shaft 120 to change the reading on the longitude indicator dial K. The initial adjustment is inserted into the indicator K by the manual adjustment 121 and the shaft 122.

The wheel 63 may be used to correct the output of an azimuth gyroscope which is part of the equipment-supplying velocity information to shafts B and C.

At high latitudes the rate of change of longitude for a given east-west velocity increases very rapidly.

In the present device the necessary power for driving both the hemisphere 61 and the longitude indicator K at high latitude is supplied primarily by the torque amplifier.

By the term error signal used in the present application is meant the difference between the system output and input.

The output of the servo system is indicated in FIG. 1 as are also the elements which constitute the feed back loop. As commonly used in the servo system as shown in FIG. 1, the term "error signal" or "error shaft" represents the difference between the input and output as modified by the transfer function of the connection which feeds the output back to the input.

Specifically in FIG. 1, the output shaft is a longitude shaft.

The feed-back connection includes the differential and the cosine L integrator and the error signal therefore exists as a difference in position between the first and second east-west position shafts shown respectively above and to the left of the error detector.

The integrators used in the application are desirably of the roller-disk type and are designated in FIG. 1 by boxes and in FIGS. 2, 3 and 4 by rollers on rotating disks such as exemplified by the roller 302 on the rotating disk 303.

To summarize the operation of correction of the azimuth gyroscope information, the azimuth gyroscope through line or shaft 411 will supply information as to the heading through the line 411 to the gearing 412 and thence by a shaft to the differential 406.

This azimuth information is corrected at differential 406 by information from the sine of latitude integrator NN of FIGS. 2 and 4 through shafts 403 and 405 or from integrator H of FIG. 3 through roller 63 and the shafts extending obliquely downwardly to the right and then horizontally to the left.

The corrected azimuth heading information is then transmitted through line 407 and slip clutch 408 to counter 409 of FIG. 4.

To summarize the error transmission, the longitude indication will be derived from the error or difference between the first and second east-west position shafts 399 and 378 of FIG. 2 or 105 and 101 of FIG. 3 which are transmitted to the error detector 335 of FIG. 2 or J of FIG. 3.

This information is then transmitted by the error shaft 202 of FIG. 3 or the equivalent electrical connections in FIG. 2 to the power amplifier 336–346 of FIG. 2 or 111–113 of FIG. 3 and thence to the longitude indicator K of FIG. 3 or Q of FIG. 2.

The error shaft of FIG. 1 (indicated also at 202 in FIG. 3) or the equivalent electrical connections extending downwardly from the error detector 335 to the magnets 336 and 337 will transmit mechanical or electrical information arising from the difference between first and second east-west position shafts of FIG. 1 (indicated at 378 and 400a in FIG. 2 or 101 and 105 in FIG. 3).

The feed back loop as indicated in FIG. 1 feeds back longitude information which is being transmitted to the longitude indicator through line 347 of FIG. 2, 117–118–119–120 of FIG. 3.

This information is supplied through shafts 390–393 and 394 to the rotating disc 396 of the cosine of latitude integrator of FIG. 2 or through shafts 69–66 to the integrator H of FIG. 3.

To this longitude information is added information as to the earth's rotation at 392–392a in FIG. 2 and at 67–68 of FIG. 3 so that the feed back loop will supply composite longitude and earth rotational information to the cosine of latitude integrator.

The feed back loop is then completed from transmission from the cosine of latitude integrator O of FIG. 2 and H of FIG. 3 to the electrical error detector 335 of FIG. 2 and through electrical connections to the magnets 336 and 337 of FIG. 2 and again to shaft 390 or to the screw and nut J of FIG. 3, the clutch 111–113 of FIG. 3 and again to the shafts 117–118–169.

The important feature of the present invention resides in the long time storage characteristics. This arises from the operation of the integrator 396–398 of FIG. 2 and 61–62 of FIG. 3 which is mechanically obtainable but not electrically obtainable as from a condenser.

The cosine of latitude integrators H and O permit accurate longitude indications within a few degrees of the poles of the earth since these integrators are capable of accommodating themselves to rapid change in longitude as takes place in travel in the polar region.

It is not feasible to obtain such long time storage with electrical integrators. The error detector J of FIG. 3 of 335 of FIG. 2 also has the storage functions in measuring the differences between the first and second east-west position shafts 400a and 378 of FIG. 2 and 101 and 105 of FIG. 3.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A longitude and latitude indicator comprising sources of east-west and north-south velocity information, integration means to integrate said information, a feed back computer system to give the longitude and a resolver for the latitude information to give sine of latitude information and cosine of latitude information and also including a first east-west position shaft receiving east-west velocity information, and a mechanical roller and rotating disc integrator for receiving cosine of latitude information from said resolver, and a second east-west position shaft receiving information from said cosine of latitude integrator and an error detector receiving and comparing information from said first and second east-west position shafts and a longitude indicator receiving longitude information from said detector.

2. A longitude and latitude indicator comprising sources of east-west and north-south velocity information, integrating and computing means to obtain latitude and longitude information from said sources, a resolver for the latitude information to give sine of latitude information and cosine of latitude information, a source of azimuth information and means for correcting said azimuth information by said sine of latitude information and by the longitude information and also including a first east-west position shaft receiving east-west velocity information, and a mechanical roller and rotating disc integrator for receiving cosine of latitude information from said resolver, and a second east-west position shaft receiving information from said cosine of latitude integrator and an error detector receiving and comparing information from said first and second east-west position shafts and a longitude indicator receiving longitude information from said detector.

3. A longitude and latitude indicator comprising sources of east-west and north-south velocity information, east-west velocity integration means to obtain east-west position and means to obtain latitude information from said source of north-south velocity information, a resolver for the latitude information to give sine of the latitude information and cosine of the latitude information, a mechanical roller and rotating disc integrator means with long-time storage characteristics for obtaining the integral with respect to the longitude of the cosine of the latitude information to give a computed east-west position, and an error detector to compare said computed east-west position against the east-west position received from the east-west velocity integration means.

4. A longitude and latitude indicator comprising sources of east-west and north-south velocity information, east-west and north-south velocity integration for obtaining the time integrals of the east-west and north-south velocity information to give output components representative of respectively east-west position and latitude, a resolver for the latitude information to give sine of the latitude information and cosine of latitude information, a mechanical roller and rotating disc integrator means with long-time storage characteristics for obtaining the integral with respect to the longitude of the cosine of the latitude information to give a computed east-west position, and an error detector to compare said computed east-west position against the east-west position received from the east-west velocity integration means, and a power-amplifier to receive information from the error detector and drive a longitude shaft to hold the computed east-west position equal to that obtained from the east-west velocity integrator.

5. A latitude and longitude indicator comprising sources of north-south and east-west velocity information as measured against a rotating earth, means to integrate the north-south velocity information to obtain latitude, means to integrate the east-west velocity information, transmission means to transmit the integrated east-west velocity information and a feed back computer receiving information from said transmission means and also including a resolver to resolve information from said north-south integrator to obtain cosine of latitude information and a roller-disc integrator to integrate said cosine of latitude information and an error detector and an amplifier receiving information from said error detector to give the longitude with respect to a rotating earth.

6. A latitude and longitude indicator comprising sources of north-south and east-west velocity information as measured against a non-rotating earth, means to integrate the north-south velocity information to obtain latitude, means to integrate the east-west velocity information, transmission means to transmit the integrated east-west velocity information and a feed back computer receiving information from said transmission means and also including a resolver to resolve information from said north-south integrator to obtain cosine of latitude information and a roller-disc integrator to integrate said cosine of latitude information and an error detector and an amplifier receiving information from said error detector to give the longitude with respect to a rotating earth.

7. A latitude and longitude indicator comprising sources of north-south and east-west velocity information as measured against a non-rotating earth, means to integrate the north-south velocity information to obtain latitude, means to integrate the east-west velocity information, transmission means to transmit the integrated east-west velocity information, a feed back computer receiving information from said transmission means and also including a resolver to resolve information from said north-south integrator to obtain cosine of latitude information and a roller-disc integrator to integrate said cosine of latitude information and an error detector and an amplifier receiving information from said error detector to give the longitude with respect to a non-rotating earth, and a differential means for subtracting the constant angular velocity of the earth from the longitude with respect to the non-rotating earth to obtain longitude with respect to the rotating earth.

8. A latitude and longitude indicator comprising sources of north-south and east-west velocity information as measured against a non-rotating earth reference, means to integrate the north-south velocity information to obtain latitude, means to integrate the east-west velocity information, a feed back computer to give the longitude with respect to a non-rotating earth reference, and a differential means for subtracting the constant angular velocity of the earth from the longitude with respect to the non-rotating earth reference to obtain longitude with respect to the rotating earth, and means for transmitting cosine of latitude information to correct information derived from the source which measures east-west velocity with respect to a non-rotating earth for the rotation of the earth reference.

9. A longitude and latitude computer comprising sources of east-west and north-south velocity information with respect to a non-rotating earth, a source of azimuth information including an azimuth gyrocscope, integration means to integrate north-south velocity to obtain change in latitude, differential means for setting an initial latitude and a latitude indicator, a resolver which gives sine and cosine of latitude information, means for integrating the east-west velocity information with respect to a non-rotating earth to obtain the change in east-west position with respect to a non-rotating earth, means for obtaining the integral with respect to longitude measured against a non-rotating earth of the cosine of the latitude information to give a computed change in east-west position with respect to a non-rotating earth, an error detector to compare said computed change in east-west position against the change in east-west position received from the east-west velocity integrating means, a power amplifier to receive information from the error detector and drive a longitude shaft to hold the computed change in east-west position equal to that obtained from east-west velocity integrator, differential means for setting an initial longitude, a longitude indicator, differential means for adding the constant angular velocity of the earth to the longitude shaft which is measured against a rotating earth to obtain longitude with respect to a non-rotataing earth for driving the cosine of latitude integrator, means for obtaining the integral with respect to longitude measured against a non-rotating earth of the sine of latitude information and means for transmitting this integral to information obtained from an azimuth gyroscope to correct for spatial change in north direction and means for transmitting cosine of latitude to correct information derived from the source which measures east-west velocity with respect to a non-rotating earth for the rotation of the earth.

10. A longitude and latitude computer comprising sources of east-west and north-south velocity information with respect to a rotating earth, a source of azimuth information including an azimuth gyroscope, integration means to integrate north-south velocity to obtain change in latitude, differential means for setting an initial latitude and a latitude indicator, a resolver which gives sine and cosine of latitude information, means for integrating the east-west velocity information with respect to a rotating earth to obtain the change in east-west position with respect to a rotating earth, means for obtaining the integral with respect to longitude measured against a rotating earth of the cosine of the latitude information to give a computed change in east-west position with respect to a rotating earth, an error detector to compare said computed change in east-west position against the change in east-west position received from the east-west velocity integrating means, a power amplifier to receive information from the error detector and drive a longitude shaft to hold the computed change in east-west position equal to that obtained from east-west velocity integrator, differential means for setting an initial longitude, a longitude indicator, differential means for adding the rotation of the earth to the longitude with respect to a rotating earth to obtain the longitude with respect to a non-rotating earth, means for obtaining the integral with respect to longitude measured against a non-rotating earth of the sine of latitude information and means for transmitting this integral to information obtained from an azimuth gyroscope to correct for spatial change in north direction and means for transmitting cosine of latitude to correct information derived from the source which measures east-west velocity with respect to a non-rotating earth for the rotation of the earth.

11. A latitude-longitude computer useful within an area of 30° from the pole and having storage and memory facilities comprising a source of north-south velocity information and a source of east-west velocity information, integrators for the east-west velocity information and for the north-south velocity information, a latitude indicator actuated by said integrated north-south information, a resolver for north-south integrated information to give sine of latitude and cosine of latitude information, integrators for the resolved sine of latitude and cosine of latitude informations, an error detector to compare the integrated information from the cosine of latitude information and the east-west velocity integrated informations, transmission means to transmit said integrated informations from the east-west velocity integrator and said cosine of latitude integrator to said error detector, an amplifier having a motor drive and also having in addition a drive from said error detector and a longitude indicator driven by said amplifier.

12. The computer of claim 11, said integrated sine information being fed to an azimuth gyroscope to correct the information derived therefrom.

13. The computer of claim 11, and means to transmit information as to the rotation of the earth to said sine and cosine integrators.

14. A latitude-longitude meter yielding accurate computations of longitude and latitude above 70° latitude and within 1200 miles of a terrestrial pole comprising a north-south integrator receiving north-south velocity information, an east-west integrator receiving east-west velocity information, a resolver receiving information from said north-south integrator and resolving it into sine and cosine latitude information, sine of latitude and cosine of latitude integrators respectively receiving said sine and cosine of latitude information from said resolver, an error detector receiving information from said cosine of latitude integrator and said east-west integrator, a power amplifier receiving information from said error detector and supplying it to said cosine of latitude integrator and a longitude indicator actuated by information from said power amplifier and a latitude indicator actuated by information from said north-south integrator.

15. The meter of claim 14 a source of information as to the earth's rotation, a differential receiving information as to the earth's rotation and also from information as to longitude and supplying it to said cosine of latitude integrator and also to said sine of latitude integrator.

16. A longitude indicator capable of operating within a short distance from the earth's pole comprising a source of north-south and east-west velocity information, north-south and east-west integrators for integrating said information, a resolver to receive the integrated information from the north-south integrator and resolve it to give cosine of latitude information, a cosine of latitude integrator having long term storage characteristics, a first east-west position transmission supplied from said east-west integrator, an error detector supplied with information from said east-west position integrator and also supplied with information from said cosine of latitude integrator, said error detector serving to compare the information from said transmission and from said cosine integrator and a longitude indicator supplied from said error detector.

17. A mechanically actuated latitude-longitude indicator having a north-south input velocity shaft, a north-south integrator having a rotating disc and a laterally displaceable contacting roller, a constant speed shaft to drive said disk, said roller being displaced on said rotating disc by said north-south velocity shaft, a north-south position shaft, a latitude indicator actuated by said position shaft, a resolver also actuated by said position shaft, resolver output shafts supplied from said resolver respectively with sine of latitude and cosine of latitude information, sine of latitude and cosine of latitude integrators having rotating discs and displaceable rollers riding on said last mentioned discs, said last mentioned rollers being displaceable by said resolver shafts, means for driving said last mentioned discs by a shaft actuated in accordance with information received as to the longitude and rotation of the earth, an east-west input velocity shaft, an east-west integrator having a rotating disc with a constant speed drive shaft and a driven roller displaceable on said disc by said east-west velocity shaft, a first east-west position shaft actuated by said east-west integrator, a second east-west position shaft actuated by said cosine integrator, an error detector actuated jointly by said first and second position shafts, an amplifier actuated by said error detector and a longitude indicator actuated by said amplifier.

References Cited by the Examiner

UNITED STATES PATENTS

| | | | |
|---|---|---|---|
| 2,022,275 | 11/1935 | Davis | 235—61 |
| 2,406,836 | 9/1946 | Holden | 235—61 |
| 2,744,683 | 5/1956 | Gray | 343—7 |

MALCOLM A. MORRISON, *Primary Examiner.*

N. H. EVANS, F. M. STRADER, C. L. JUSTUS,
*Examiners.*

A. GEER, R. D. BENNETT, R. VANKIRK, M. R. WILBUR, K. W. DOBYNS, *Assistant Examiners.*